(12) United States Patent
Palmer et al.

(10) Patent No.: US 10,803,580 B2
(45) Date of Patent: Oct. 13, 2020

(54) VIDEO IMAGE PROCESSING AND MOTION DETECTION

(71) Applicant: Wearless Tech Inc., Mountain View, CA (US)

(72) Inventors: Victor Jared Palmer, San Jose, CA (US); Pavan Kumar Pavagada Nagaraja, Mountain View, CA (US)

(73) Assignee: Wearless Tech Inc., Mountain View, CA (US)

( * ) Notice: Subject to any disclaimer, the term of this patent is extended or adjusted under 35 U.S.C. 154(b) by 163 days.

(21) Appl. No.: 16/169,609

(22) Filed: Oct. 24, 2018

(65) Prior Publication Data

US 2020/0134813 A1 Apr. 30, 2020

(51) Int. Cl.
*G06T 7/20* (2017.01)
*G06T 7/00* (2017.01)

(52) U.S. Cl.
CPC .......... *G06T 7/0012* (2013.01); *G06T 7/20* (2013.01); *G06T 2207/10016* (2013.01); *G06T 2207/20021* (2013.01)

(58) Field of Classification Search
CPC .......... G06T 7/0012; G06T 7/20; G06T 2207/10016; G06T 2207/20021
See application file for complete search history.

(56) References Cited

U.S. PATENT DOCUMENTS

| 2008/0166020 A1* | 7/2008 | Kosaka | G06K 9/00778 382/107 |
| 2012/0004514 A1* | 1/2012 | Marugame | G06K 9/00147 600/300 |
| 2016/0232682 A1* | 8/2016 | Nakagawa | G06T 7/215 |
| 2017/0236277 A1* | 8/2017 | Oshima | G06T 7/20 382/103 |

OTHER PUBLICATIONS

"Video Magnification", CSAIL, accessed Dec. 12, 2018, 4 pages. http___people.csail.mit.edu_mrub_vidmag_.

* cited by examiner

*Primary Examiner* — Chuong A Ngo
(74) *Attorney, Agent, or Firm* — Lowenstein Sandler LLP

(57) ABSTRACT

A system for detecting motion in one or more images of a video feed captured by an image capture device. The system collects the multiple images of the video feed and segments each image into multiple portions or cells. Multiple cell groups are determined based on the images, with each cell group including information relating to contents of set of a common portion of the multiple images. A difference metric is calculated for each of the cell groups and at least one level of change of values of the difference metric is determined. The at least one level of change is data representing the video feed that is compared with a still-scene data model associated with the image capture device to determine a respective probability that each of the cell groups includes motion. Motion is identified for those cell groups that have a probability greater than or equal to a threshold value. The system generates a transformed video feed including the video feed and a visual indication of the motion.

20 Claims, 7 Drawing Sheets

FIG. 5

| Grid of pixels in Cell 1 (with pixel intensity values) at T1 | Grid of pixels in Cell 1 (with pixel intensity values) at T2 | Grid of pixels in Cell 1 (with pixel intensity values) at T3 |
|---|---|---|
| 128 255 255 | 255 128 255 | 255 255 128 |
| 0 255 255 | 255 0 255 | 255 0 128 |
| 0 255 255 | 255 0 255 | 255 0 128 |
| 0 128 128 | 128 0 128 | 255 0 128 |
| 128 128 128 | 128 128 128 | |

| DIFFERENCE METRIC [D(G, Time 1, Time 1/2/3)] | DIFFERENCE METRIC [D(G, Time 2, Time 1/2/3)] | DIFFERENCE METRIC [D(G, Time 3, Time 1/2/3)] |
|---|---|---|
| 0 [D(G,1,1)] | 1530 [D(G,2,1)] | 2292 [D(G,3,1)] |
| 1530 [D(G,1,2)] | 0 [D(G,2,2)] | 1530 [D(G,3,2)] |
| 2292 [D(G,1,3)] | 1530 [D(G,2,3)] | 0 [D(G,3,3)] |

First Level of Change (set of first level of difference values)

| σ(G,1) | σ(G,2) | σ(G,3) |
|---|---|---|
| 538 | 0 | 538 |

VIDEO IMAGE PROCESSING AND MOTION DETECTION

BACKGROUND

Various image capture scenarios relate to the processing of a video feed of a field of view associated with an image capture device. In many instances, it is desirable to determine if very small motions are detected in the frames or images of the video feed. For example, a variety of different network-connected cameras are in use for various applications, including security, healthcare monitoring, etc. However, for very small motions, available video capture devices can exhibit pixel-level noise floors which are roughly the same magnitude as the motion to be detected. Previous approaches (http://people.csail.mit.edu/mrub/vidmag/) have been proposed to identify such sub-noise-floor small motions when those small motions are periodic and the video is sampled at very frequent intervals. However, some very small motions may be aperiodic, and also available video capture devices may not be capable of capturing video at a high, regular frequency.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIG. 5 illustrates an example processing of a first cell of a series of images collected over a period of time, including calculations of difference metric based on pixel intensity values and an associated level of change of the difference metrics, according to one embodiment.

Figure 1:
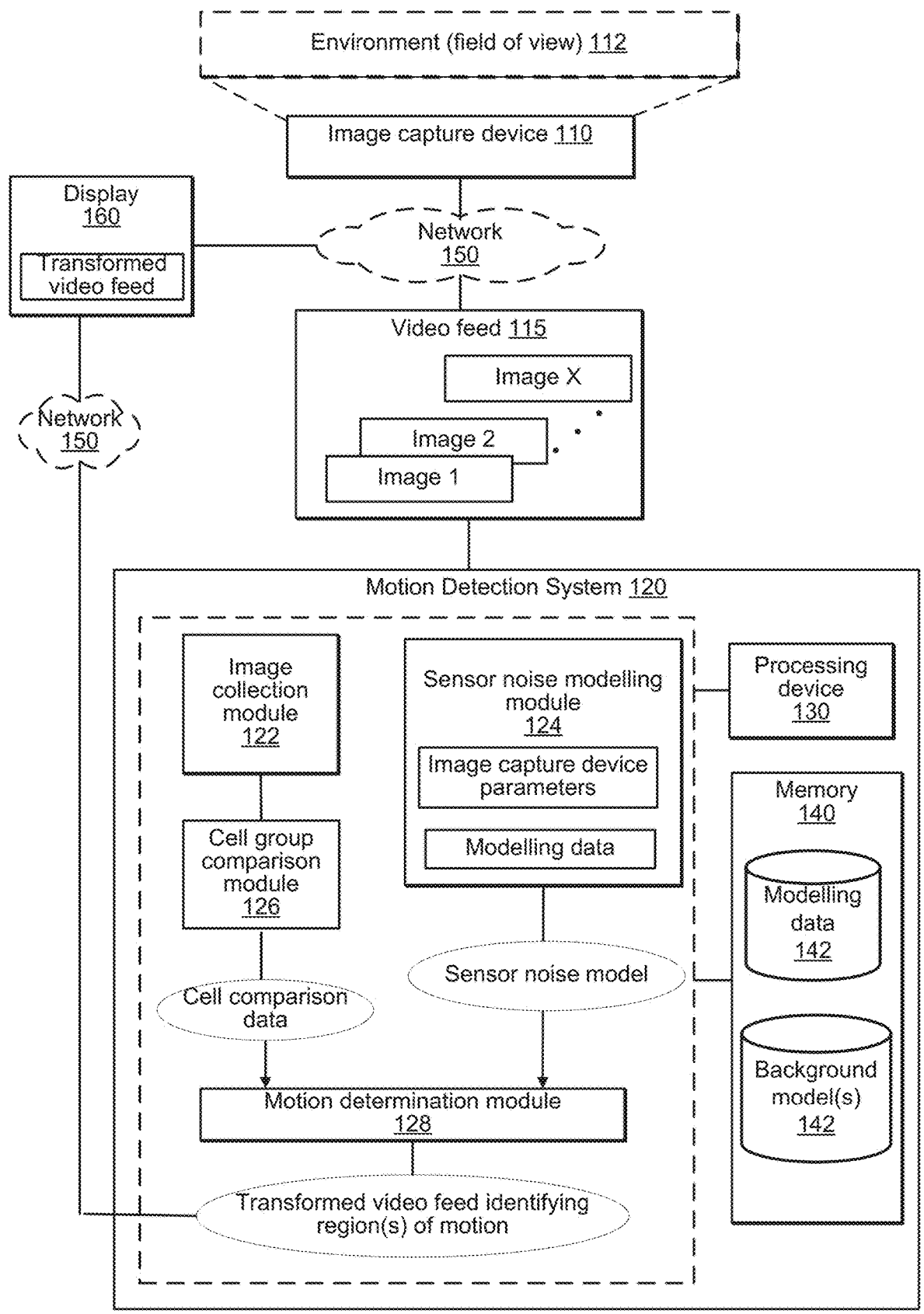
FIG. 1 illustrates an example motion detection system, according to one embodiment.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to processing a video feed received from a video capture device to determine whether one or more regions of a set of images of the video feed include motion. In one embodiment, a process is described wherein multiple images of a video feed are collected over a period of time (e.g., Image 1 at Time 1, Image 2 at Time 2, Image 3 at Time 3 . . . Image X at Time X). The individual video images may be segmented into an arrangement of regions, portions, or sub-images, also referred to as "cells". In one embodiment, a video image or frame is segmented into a grid of rows and columns of the multiple cells (e.g., Cell 1, Cell 2, Cell 3 . . . Cell M×N, for an M×N matrix of cells, wherein the matrix includes M columns and N rows). In one embodiment, the matrix of cells collectively make up the full image of the video feed at a point in time (e.g., Time 1, Time 2, Time 3, . . . Time X) for the collection of frames or images of the video feed.

In one embodiment, changes in a selected value (e.g., pixel intensity values) associated with each cell over time are determined. A selected parameter value (e.g., a sum of the absolute values of the pixel intensity differences) is compared for a cell of a first image (e.g., at time 1) and all of the other images in the set of images to determine a cell-level difference metric between the images (e.g., a first pixel-wise difference metric between cell 1 at time 1 and cell 1 at time 2, a second pixel-wise difference metric between cell 1 at time 1 and cell 1 at time 3 . . . and a further pixel-wise difference metric between cell 1 at time 1 and cell 1 at time X). The comparison process is performed for each of the various time pairs such that each cell at a particular time is compared with that cell at each of the other times. For example, in addition to the comparisons described above, a comparison is made for each of the following pairs: cell 1 at time 2 compared to cell 1 at time 3; cell 1 at time 2 compared to cell 1 at time X, cell 1 at time 3 compared to cell 1 at time X, and so on.

In one embodiment, based on the calculated difference metrics, a first level of change of the difference metrics is calculated for each cell at every point in time. In one example, the first level of change values are determined by separating the difference metrics for a cell 1 into time-based subsets, and then calculating a standard deviation value for the difference metric values in each subset to generate a series or set of first level of change values. In one embodiment, a second level of change (e.g., a standard deviation for the set of first level of change values) is computed. Advantageously, the level of change information associated with the grid of pixels provides for the quantification of an amount of motion detected.

In an embodiment, the first level of change information may be pattern-matched for various applications to characterize or classify the motion as one or more patterns of motion. For example, the first level of change information may be compared to a pattern representing respiratory activity of an infant. In this example, if the first level of change information matches the infant respiratory activity pattern, the first level of change information and associated video feed may be characterized or classified as including or representing infant respiratory activity. Other example patterns may include, but are not limited to, earthquake vibration patterns, epileptic or seizure activity patterns, etc. In an embodiment, any activity may be analyzed to generate a pattern of motion associated with the activity which can then be compared (pattern matched) to the first level of change information to determine if the identified motion matches the predetermined activity pattern for classification purposes. In an embodiment, advantageously, the first level of change information associated with the grid of pixels may provide a one-dimensional signal that may be used to characterize the type of motion present in a video feed and enable classification as one or more activity types (e.g., respiratory activity, earthquake activity, seizure activity, etc.).

In one embodiment, sensor noise modelling is performed to generate a model to account for sensor noise associated with an image capture device. In one embodiment, the sensor noise model represents an image capture device-specific model that is based on image capture device-specific performance data and may provide a representation of the camera's operation when capturing a still scene (e.g., a scene including no object motion). In one embodiment, the model provides a statistical representation of operational performance of the camera under established conditions (e.g., shooting a still scene) and approximates sensor noise associated with the camera. In one embodiment, the sensor noise model may be generated and stored with respect to a particular camera based on one or more parameters associated with the camera (e.g., image sensor type, frame rate, image quality, resolution, pixel size, refresh rate, etc.).

In one embodiment, one or more regions of the images of the video feed including true object motion (e.g., pixel intensity changes that are not due to sensor noise) are identified based on a comparison of the information generated based on the video feed (e.g., the second level of change described above) and from the camera sensor noise model. In one embodiment, sensor noise associated with the camera is accounted for and actual or true object motion in one or more regions of the captured video feed is identified. In one embodiment, an indication (e.g., a visual indication) of the detected motion is identified in connection with the captured video feed. In one example, the captured video feed is transformed to include the raw video feed and an indication of the detected motion (e.g., a heat map type indication, a highlighting of the detected motion, a visual alarm, an audio alarm, a combination of a visual and audio alarm, etc.).

In one embodiment, based on the difference metric data, a first level of change corresponding to each cell group is calculated at each point in time. In one embodiment, the first level of change for a cell at time X is represented by the standard deviation of the subset of all the difference metrics which reference the cell-contents at time X (e.g., the difference metric between the cell at time 1 and time X, the difference metric between the cell at time 2 and time X, etc.). In one embodiment, a standard deviation value is computed for each cell and each point in time based on the pixel-wise difference metric values (e.g., a sum of absolute values of the pixel intensity differences) calculated and stored in the step described above. In one embodiment, a second level of change (e.g., a standard deviation of the set of first level of change values) is computed for each of the cell groups of the video feed.

FIG. 1 is a block diagram illustrating various components of a motion detection system 120, according to one embodiment. In one embodiment, the motion detection system 120 may be implemented via a network-connected server or via processing system of an image capture device 110 configured to capture and process images corresponding to an environment 112 (e.g., a field of view) including one or more regions of interest having one or more objects of interest. In one embodiment, the motion detection system 120 may include an image collection module 122, a sensor noise modelling module 124, a cell group comparison module 126, and a motion determination module 128. In one embodiment, the motion detection system 120 may further include a network interface (not shown) configured to enable communications between the motion detection system 120 and one or more other devices or systems (e.g., the image capture device 110, display 160, etc.). The motion detection system 120 further includes a processing device 130 and a memory 140 configured to execute and store instructions associated with the functionality of the various components, services, and modules of the motion detection system 120, as described in greater detail below in connection with FIGS. 2-7.

In one embodiment, one or more portions of the motion detection system 120, or the entire motion detection system 120, may reside "on board" the image capture device. In one embodiment, the display 160 may be a component of the image capture device 110 or a part of an external system (e.g., the motion detection system or other server) and connected to the image capture device 110 and/or the motion detection system 120 via the network 150. For example, the network interface 132 may be any suitable communication interface such as an onboard cell modem, a WiFi antenna, a Bluetooth communication device, or other internet access device. In one embodiment, the network 150 may be any suitable network, including, for example, the Internet, intranets, extranets, wide area networks (WANs), local area networks (LANs), wired networks, wireless networks, or other suitable networks, etc., or any combination of two or more such networks.

In one embodiment, the image capture device 110 may capture a video feed corresponding to the environment 112 within the image capture device's 110 field of view. In one embodiment, the image capture device 110 generates a video feed including multiple video images (e.g., Image 1, Image 2 . . . Image X) captured over a period of time (e.g., Time 1 to Time X). In one embodiment, the motion detection system 120 is employed to determine if the video feed 115 includes one or more regions with true motion (e.g., object motion that is not due to sensor noise) detected. In one embodiment, the video feed 115 may include a digital representation of the series of images of at least a portion of the environment 112.

In one embodiment, the image collection module 122 of the motion detection system 120 receives the video feed 115. In one embodiment, the image collection module 122 includes a set of instructions (executable by the processing device 130) configured to segment or decimate each of the images of the video feed 115 into an arrangement of sub-images or portions, herein referred to as "cells".

Figure 2:
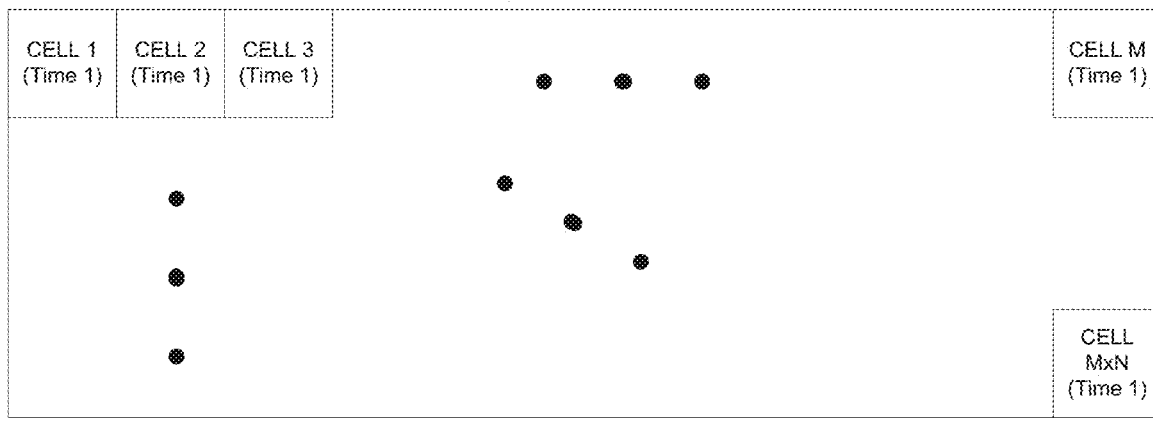
FIG. 2 illustrates exemplary image cell-grid arrangements corresponding to collected images of a video feed, according to one embodiment.
Figure 2:
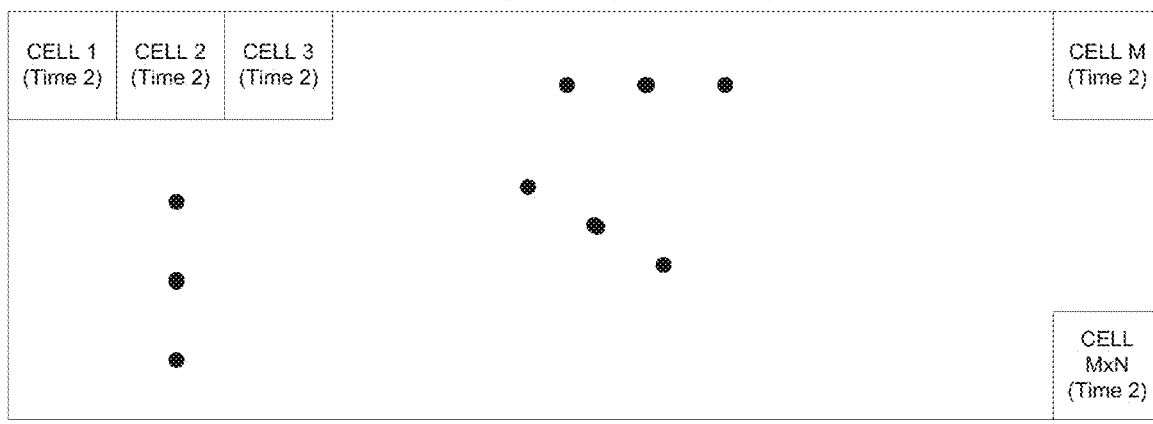
Figure 2:
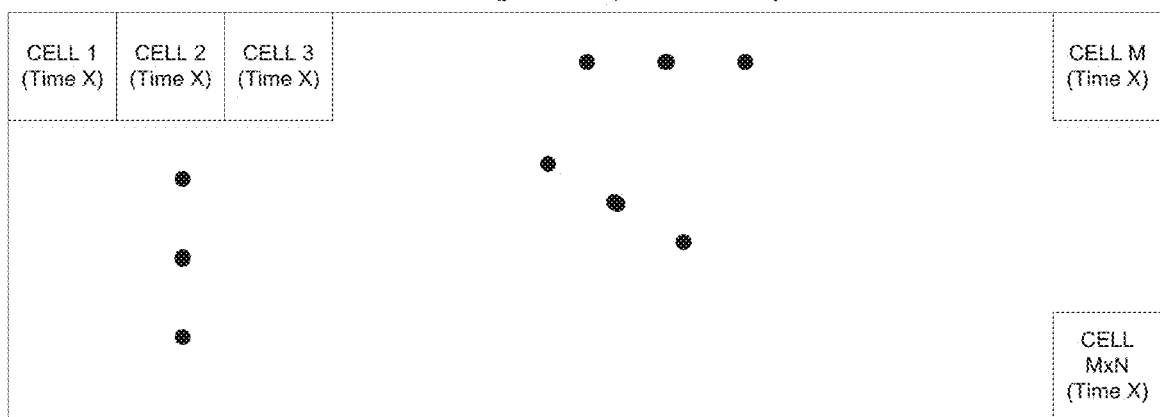

In one embodiment, each image of the video feed 115 is segmented into a grid of rows and columns of the multiple cells (e.g., Cell 1, Cell 2, Cell 3 . . . Cell M×N, for an M×N matrix of cells, wherein the matrix includes M columns and N rows), as shown in FIG. 2. FIG. 2 illustrates an example of a grid cell arrangement of three images (Image 1 corresponding to Time 1), Image 2 corresponding to Time 2, and Image X corresponding to Time X). As shown in FIG. 2, each of the images is segmented into an array of columns and rows (M×N) of cells (e.g., Cell 1 through Cell M×N of the image at the corresponding time. In one embodiment, the image collection module 122 may generate cells and a grid cell arrangement having any suitable size and shape. In one embodiment, same sized color or grayscale images may be collected from the image capture device 110 over time and stored in a buffer. In one embodiment, each image is decimated according to an established grid system (e.g., as selected by a user, in accordance with a default setting, determined based on the image size, determined based on the image capture device type, etc.) to produce the cell images from each captured image.

In one embodiment, the time between when each image is produced by the image capture device 110, and the order in which the images are stored in the image buffer associated with the image collection module 122 may vary. Advantageously, the image collection module 122 and associated functionality may be performed for a variety of image capture device types and network conditions and does not need to process the images sequentially or with a particular image generation rate/frequency. In one embodiment, the matrix of cells collectively make up the full image of the video feed at a point in time (e.g., Time 1, Time 2, Time 3, ... Time X) for the collection of frames or images of the video feed. In one embodiment, the cell group comparison module 126 formulates multiple cell groups based on the multiple cells generated by the image collection module 122. In one embodiment, a grid-cell group (G) is formed for each cell (e.g., Cell 1) for each captured image over the period of time (e.g., the grid-cell group ($G_1$) includes Cell 1 of Image 1 at Time 1, Cell 1 of Image 2 at Time 2 ... Cell 1 of Image X at Time X). Multiple grid-cell groups are generated, one for each cell of the grid (e.g., $G_1$ for Cell 1, $G_2$ for Cell 2, $G_{M \times N}$ for Cell M×N).

Figure 3:
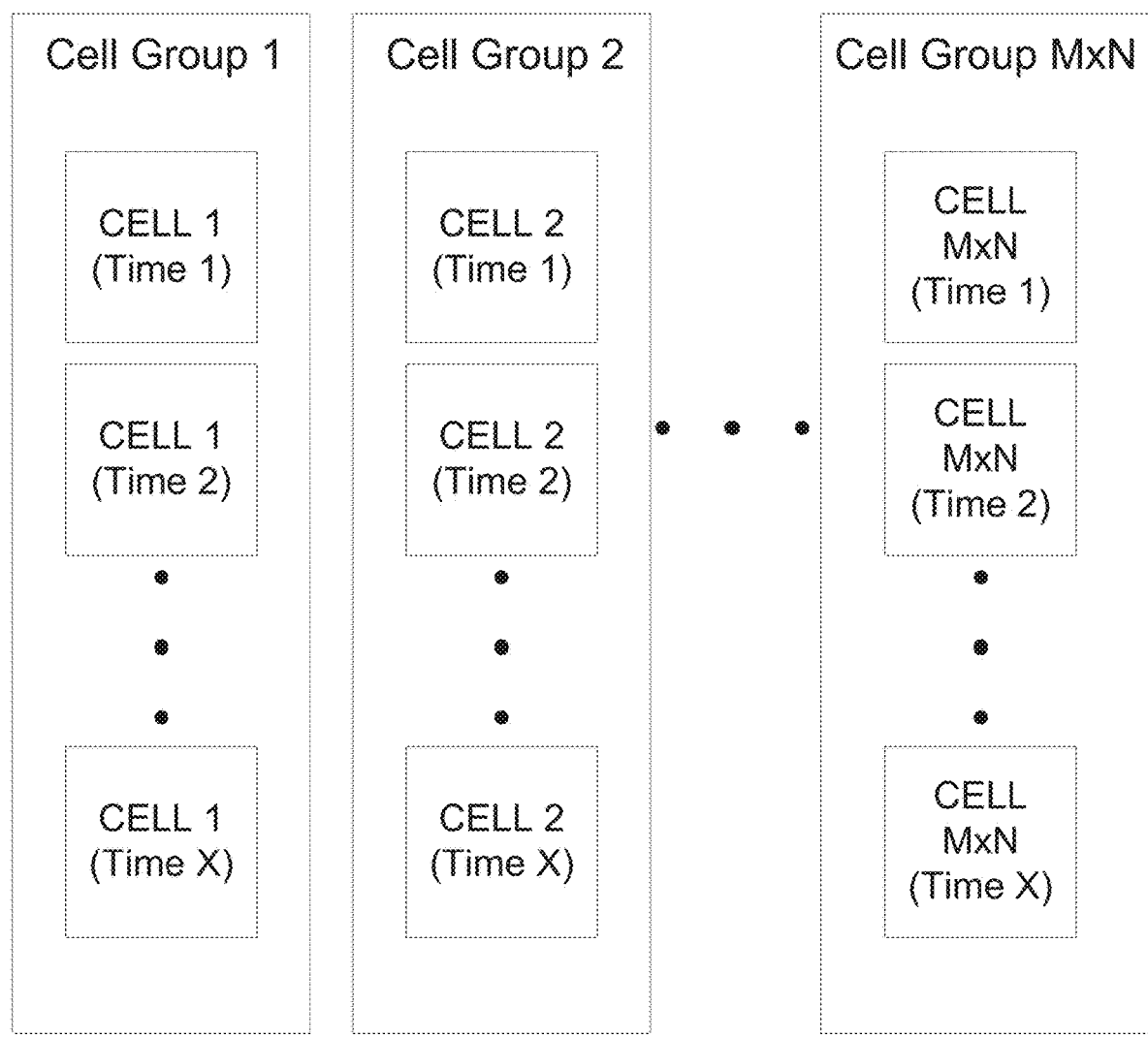
FIG. 3 illustrates exemplary cell groups corresponding to cells of images of a video feed, according to one embodiment.

FIG. 3 illustrates exemplary cell groups (Cell Group 1, Cell Group 2, and Cell Group M×N) corresponding to the images and cells shown in FIG. 2. As illustrated, the cell comparison module 126 generates a first cell group including all of the first cells (e.g., Cell 1) collected over the time period (e.g., Cell 1 at Time 1 through Cell 1 at Time X). Advantageously, the cell comparison module 126 may formulate the cell groups by identifying and clustering the respective common cell (e.g., Cell 1 for Cell Group 1) in any sequence (e.g., the cell comparison module 126 may pull or extract the common cell from the image buffer in any sequence, including non-sequentially.

In one embodiment, the cell comparison module 126 performs a comparison of the multiple cells within each cell group. In one embodiment, for each grid-cell group, the cell comparison module 126 determines a difference metric between each pair of cell images in the cell group. For example, the cell comparison module 126 formulates a first pair (e.g., Pair 1) including Cell 1 at Time 1 and Cell 1 at Time 2, a second pair (e.g., Pair 2) including Cell 1 at Time 1 and Cell 1 at Time 3), a third pair (e.g., Pair 3) including Cell 1 at Time 1 and Cell 1 at Time X, and so on for each of the cells. The cell comparison module 126 continues this process to formulate time pairings for each of the possible pairings in the cell group (e.g., Cell 1 at Time 2 paired with Cell 1 at Time 3, Cell 1 at Time 3 paired with Cell 1 at Time X, etc.). In one embodiment, the difference metric is determined based on a comparison of a selected parameter or measurable value between each pair of cell images in the cell group (e.g., each combination of cell images in the cell group). For example, the difference metric may be based on a comparison of the sums of absolute pixel intensity values for the pixels of each cell in each cell pair). According to embodiments, the difference metrics may be based on any suitable parameter or combination of parameters, including the sum of the absolute values of the pixel intensity differences, a monotonic increasing function of the sum of the absolute values of the pixel intensity differences (e.g., the square of the sum of the absolute values of the pixel intensity differences), application of a mask to improve computational efficiency (e.g., computing the sum of the absolute difference of every other pixel), etc.

In one embodiment, for a given cell pair, an absolute difference of pixel intensities is computed (e.g., the absolute difference of pixel intensities of the pixels of cell G at a first time and the pixels of cell G at second time is computed). In one embodiment, the calculated difference metrics are stored (e.g., in tabular form). In one example, a table is generated including a number of columns, wherein a first column corresponds to a measurement of the difference between the contents of cell 1 at time 1 and all other times in the time period. In one embodiment, the difference metric is calculated for each of the identified cell groups (e.g., Cell Group 1, Cell Group 2, etc.).

Figure 4:
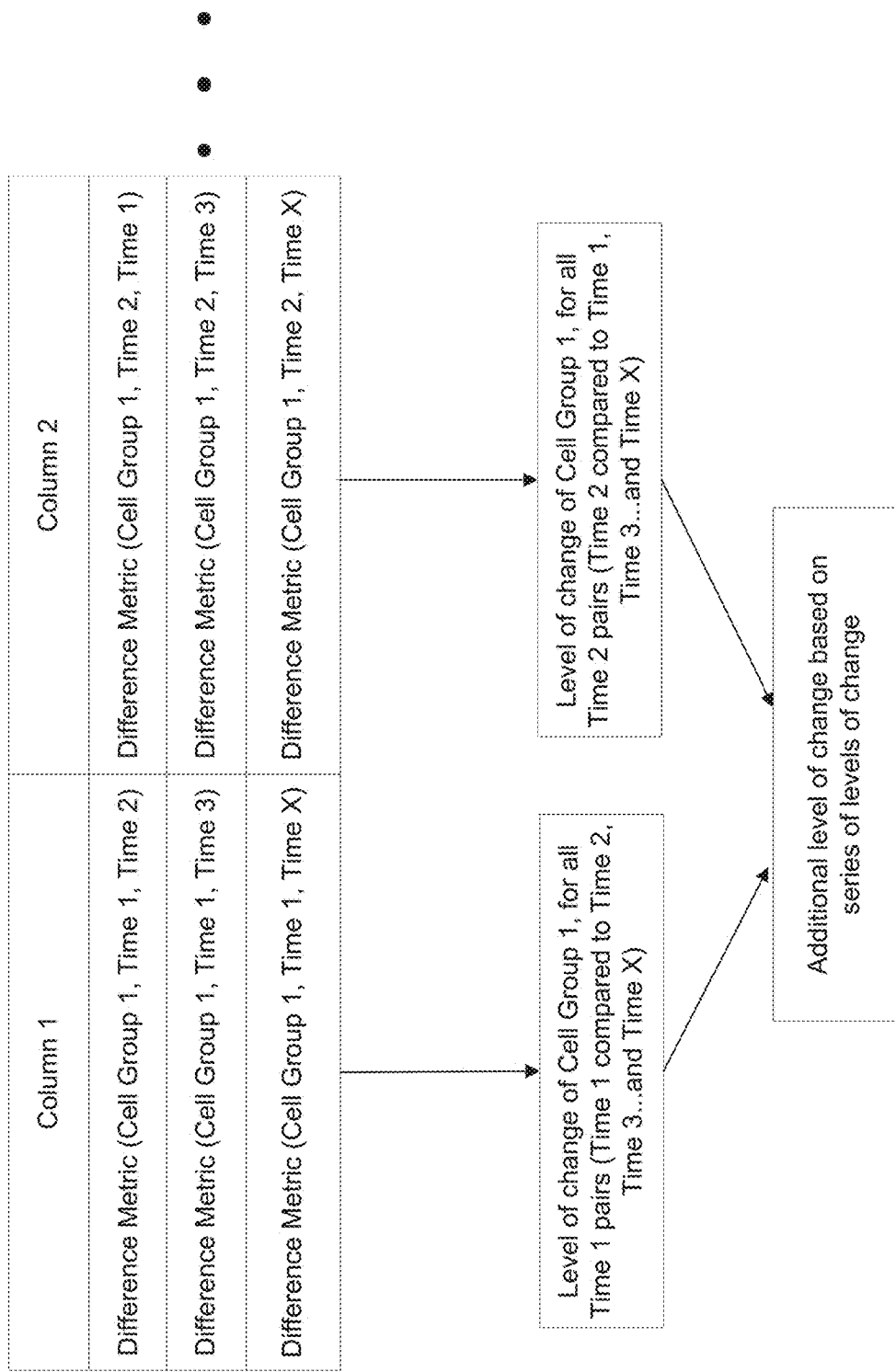
FIG. 4 depicts an example tabular representation of difference metrics determined for multiple cell groups corresponding to cells of images collected over a period of time, according to one embodiment.

FIG. 4 shows an example table generated by the cell comparison module 126, according to an embodiment. As shown in FIG. 4, for each cell group (G), calculations are performed on the contents of that cell group between each pair of different times. The example shown in FIG. 4 relates to a first cell group (G1) over a period of time from Time 1 to Time X. Accordingly, since there are X time points, an X by X sized table is generated wherein each entry represents a respective difference metric (e.g. a sum of absolute differences of pixel intensity values (D)) for each time pair. For example, D(G1,1,2) represents a sum of absolute differences in pixel intensity values for the pixels of cell 1 at time 1 compared to time 2 As shown in FIG. 4, each column corresponds to a measurement of the difference (i.e., the difference metric) between the cell contents at Time 1 and the cell contents at all other times (e.g., Time 2, Time 3, Time X) within the relevant time period. In the example shown in FIG. 4, column 2 shows the difference metric (e.g., the sum of absolute differences in pixel intensity values for the pixels of cell 1 at time 2 compared to all of the other times in the relevant time period (D(G1, 2, 1)), (D(G1, 2, 3)), (D(G1, 2, X)).

In one example, a first-level-of-change is determined by computing the standard deviation (σ) for each of the columns (e.g., σ(G, 1), σ(G, 2), etc.). Accordingly, for each cell group (G), a series of standard deviations are generated as the cell comparison data. In one embodiment, a second level of change is determined for the cell. In one example, the second level of change is a standard deviation of the first level-of-change values, according to the following:

$$S(G) = \text{StdDev}\{\sigma(G,1), \sigma(G,2), \ldots, \sigma(G,x)\}$$

In one embodiment, if the portion of the video feed contained in a cell group (G) does not contain motion, the pixel-differences D(G,i,j) between images at different times (i,j) are solely caused by sensor noise and can be sampled from a distribution (e.g., a static distribution wherein the sensor characteristics do not change over the sampling period), resulting in:

$$\sigma(G,1) \approx \sigma(G,2) \approx \ldots \approx \sigma(G,K) \text{(Stationary Scene } \sigma \text{ Values)}$$

In one embodiment, the cell comparison module 126 generates the cell comparison data including the level of change of the difference metric values (e.g., in tabular form) and provides the cell comparison data to the motion determination module 128. In one embodiment, the motion determination module 128 is configured to compare the cell comparison data associated with the video feed 115 to the sensor noise model generated by the sensor noise modelling module 124. The sensor noise modelling module 124 is configured to analyze image capture device parameters (e.g., camera type, sensor type, processing speed, frame rate, etc.) associated with a particular image capture device and modelling data (e.g., images and frames captured by the image capture device of an environment including a still-scene with no object motion). In one embodiment, the modelling data represents a still-scene and may be used by the sensor noise modelling module 124, along with the image capture device parameters, to model the sensor noise associated with the image capture device. In one embodiment, since the modelling data is based on a still-scene environment, frame-to-frame differences (e.g., pixel intensity value differences between frames) may be attributed to and characterized as sensor noise.

The sensor noise modelling module 124 provides the sensor noise model to the motion determination module 128. In one embodiment, the sensor noise model may be provided in the form of second level of change values for each cell group of the still-scene video data. In one embodiment, the second level of change may be represented as a standard deviation (e.g., standard deviation (S) as described above) of the first level of change values based on difference metrics (e.g., sum of absolute differences of pixel intensity values) for each cell group (G) according to the sensor noise model associated with the image capture device, wherein the differences are considered sensor noise. The sensor noise modelling module 124 first computes a histogram of the second level of change values (S(G)) from the sensor noise model video data, and then chooses a statistical distribution which fits the histogram with low error. In one embodiment, the second-level-of-change values S(G) generated from with the sensor noise model video data may be approximated as a normal distribution. In one embodiment, the shape of the distribution of second level of change values (S(G)) generated from the sensor noise video data is camera-sensor dependent but independent of the environment being imaged. An additional advantage is realized by the present application, in that sensor noise modelling data and corresponding sensor noise model may be generated for various types of image capture devices, and as such, any image capture device may be employed in connection with the described system. In this regard, the motion detection processing of the present application is camera-independent, such that sensor noise associated with the respective camera is taken into account to enable the identification of true object motion in a video feed.

FIG. 5 illustrates an example wherein the video feed includes a cell group of images (G) with a vertical black bar moving from left to right against a white background over a period of time (e.g., Time 1 (T1) through Time 3 (T3)). In one embodiment, if the portion of the video feed contained in a cell group (G) contains motion, the σ(G . . . K) behaves differently. As shown in FIG. 5, the pixel intensity values for each of the pixels (in a 5×3 pixel arrangement) of cell 1 is shown as the black bar moves across the cell from T1 to T3. In this example, the cell group G includes cell 1 at T1, T2, and T3. As shown in FIG. 5, a pixel-wise difference is computed comparing the cell contents of the each pairing of cells in the cell group at different times (e.g., a first pair including (Cell 1, T1, T2), a second pair including (Cell 1, T1, T3), a third pair including (Cell 1, T2, T3), and so on for each of the possible cell 1 pairs in the cell group. For example, the sum of absolute differences of pixel intensity values (difference metric D) difference of pixel intensity (e.g., in absolute value form) of cell 1 at Time 1 compared to cell 1 at Time 2 results in a value of sum of absolute differences of pixel intensity values (D) of 1530. As shown, it is determined that the cell group G image cell 1 at Time 1 and Time 3 (i.e., the extreme ends of the motion) are relatively more different from each other (e.g., a pixel-wise difference metric as reflected by the sum of absolute differences of pixel intensity values of having an absolute value of 2292) than the difference metrics generated when comparing the cell contents of cell 1 at Time 1 to the cell contents of cell 1 at Time 2 (e.g., a pixel-wise difference metric having an absolute value as reflected by the sum of absolute differences of pixel intensity values of 1530).

As shown in FIG. 5, the first level of change as represented by the standard deviation (σ) for each column (σ(G, 1 . . . 3) is computed (with the diagonal entries discarded as equal to 0). In one embodiment, it is determined that the image at T2 is substantially similar to both the image at the start of the motion (i.e., T1) and the end of the motion (i.e., T3), the standard deviation of the pixel differences when the T2 image is one of the difference pairs is small (i.e., σ(G,2) is relatively small). In one embodiment, as shown in FIG. 5, it is determined that the extrema of the motion (T1 and T3) exhibit a relatively higher level of change when compared to one another than the level of change when compared to T2. Accordingly, σ(G,1) and σ(G,3) are relatively larger than σ(G,2). In one embodiment, a determination may be made that for cells that contain motion, the following relationship is identified:

$$\sigma(G,1) \neq \sigma(G,2) \neq \ldots \neq \sigma(G,K) \text{[Moving Scene } \sigma \text{ Values]}$$

The motion determination module 128 compares the sensor noise model to the cell comparison data to identify one or more regions of the video feed that include object motion. In one embodiment, if the video feed includes an environment having a combination of cells in motion and cells that are still, a histogram of second-level-of-change S values across all cells may be composed of two distinct regions (i.e., may be bimodal). The first region will be from the S values of cells which do not contain motion, and should be shaped like the distribution provided by the sensor noise modelling module 124. The second region may be from the cells with object motion, whose S-values may have an unknown distribution, but have higher S values than the S values from the still-cells (since (Dynamic Scene σ Values) demonstrate more variation).

In one embodiment, the motion determination module 128 computes a second level of change (e.g., a variance of the standard deviation values σ(G,i) for each cell group G). In one embodiment, the motion determination module 128 computes a standard deviation of the σ(G,i) values for each cell group (G) yielding:

$$S(G) = \text{StdDev}\{\sigma(G,1), \sigma(G,2), \ldots, \sigma(G,K)\}$$

In one embodiment, the S(G) is determined to be relatively higher for a cell that contains motion as compared to a cell that does not motion. In one embodiment, the motion determination module 128 assigns a probability of motion (P) to each cell by fitting the probability distribution chosen by the sensor noise model module 124 to the bi-modal histogram of S-values associated with the video feed including a combination of still cells and motion cells. By using an outlier-resistant fitting technique such as Broyden-Fletcher-Goldfarb-Shanno numerical optimization, this fitting should selectively describe the contribution to the S-values histogram from by the still-cells since generally there are more still cells than cells in motion. As such the resulting fitted probability distribution describes the random distribution of S-values associated with the still-cells in the scene. The results of the fitting are the parameters of the probability distribution used (for example, a mean and standard deviation (σF) and mean (μF) are computed in the case where a normal distribution is used). This fitted probability distribution may then be used to compute a probability that a given cell's S-value could have occurred by chance (e.g., a p-Value) given the fitted probability distribution. In particular, since the fitted probability distribution describes the S-values associated with the larger population of still-cells in the scene, this probability distribution may be used to compute the probability that a given cell's S-value belongs to the still-cell population (i.e., the probability that a still-cell could have a particular associated S-value).

In one embodiment, the motion determination module 128 assigns a probability of motion (P) to each cell by using numerical optimization (for example using the Broyden-Fletcher-Goldfarb-Shanno algorithm) to fit the distribution from the sensor noise model module 124 to a histogram associated with the video feed including a combination of still cells and motion cells. In one example, a normal distribution may be fit to the S(G) distribution from the video feed including a combination of still cells and motion cells, and following the numerical optimization, a mean and standard deviation (σF) and mean (μF) are computed.

In one embodiment, the motion determination module 128 assigns a probability that a cell group G contains motion. In one embodiment, the probability is assigned by using a normal distribution probability equation, such as:

Probability that cell group $G$ contains motion=$\frac{1}{2} \times (1-\text{Erf}((S(G)-\mu F)/(\sigma F\sqrt{2})))$;

wherein Erf is the Error Function (a standard statistical function), μF is is the mean of the fitted normal distribution, and σF is the standard deviation of the fitted normal distribution.

In one embodiment, having determined the probability of motion (P) for each cell group, the probability values may be used to identify the one or more regions (e.g., cells or portions of the video feed) that include motion. In one embodiment, the probability values for each cell group may be compared to a threshold value (e.g., a value selected by a user or set as a default in the system) such that a motion probability for a cell group that has a value that is equal to or greater than the threshold value is classified as including motion. In one embodiment, if a cell group has a motion probability that is less than the threshold value, the cell group may be classified as "stationary," "still," or "including no motion."

In one embodiment, the motion determination module 128 transforms the video feed 115 to include an indication of the one or more regions (or cells) that have been identified as including motion. In one example, the video feed may be transformed to include a visual indication (e.g., a heat map with the detected motion highlighted, etc.), an audio indication (e.g., an audio alarm or alert), or a combination thereof. In one embodiment, the transformed video feed identifying the region(s) of motion may be provided for output via a display 160. As shown in FIG. 1, the display 160 may be a part of the motion detection system 120, a component of an external system communicatively connected to the motion detection system 120 and the image capture device 110 via a network 150, or a component of the image capture device 110. In one embodiment, the transformed video feed may be rendered via the display 160 or provided to another system or application for further processing. For example, the transformed video feed with motion detection information may be used in various other applications, such as healthcare monitoring, security, etc. In one embodiment, an alert (e.g., a message, a visual display, an audio alert, etc.) may be generated in response to a determination of a classification or categorization of the image as either stationary or non-stationary.

Figure 6:
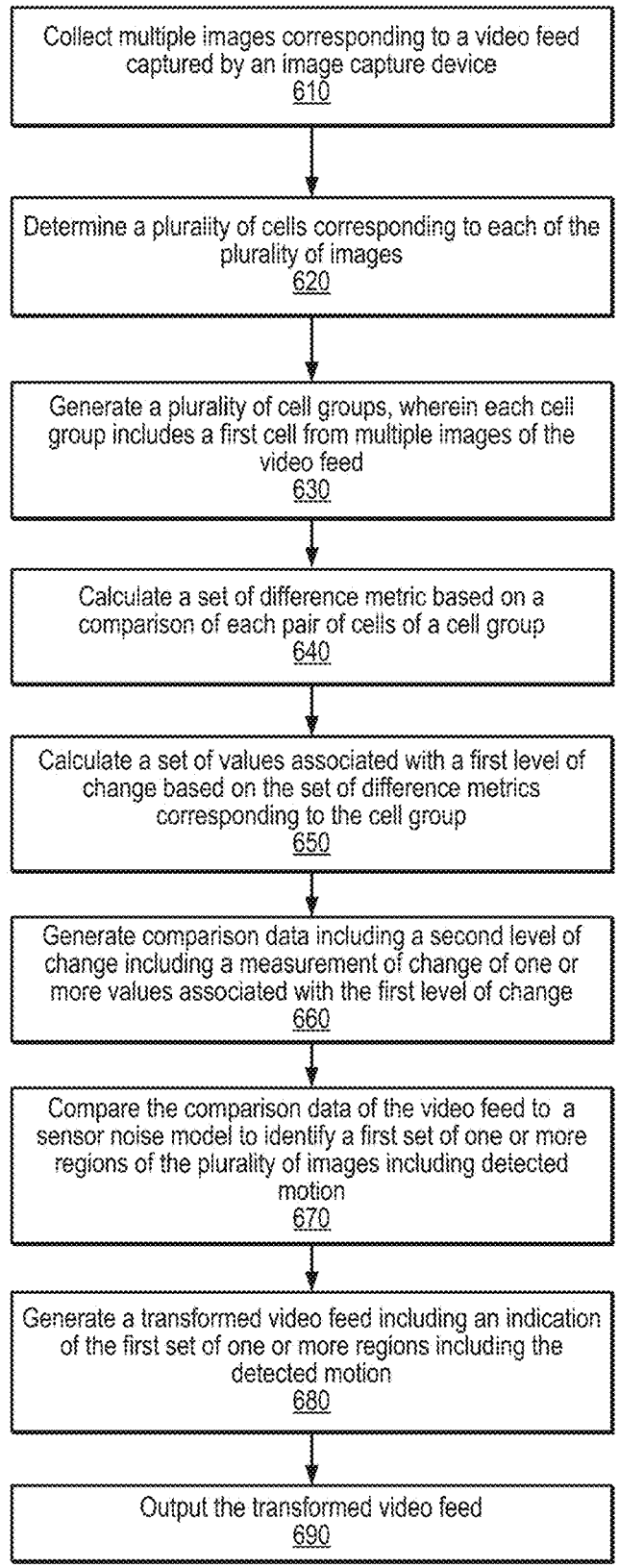
FIG. 6 is a flow diagram illustrating one embodiment of a motion detection process, according to one embodiment.

FIG. 6 illustrates a flowchart that provides an example of a process 200 executed by a motion detection system (e.g., motion detection system 120 of FIG. 1), according to various embodiments. It is understood that the flowchart of FIG. 6 provides an example of the many different types of functional arrangements that may be employed to implement the operation of the motion detection system 120 as described herein. Process 600 may be performed by a processing logic that may comprise hardware (e.g., circuitry, dedicated logic, programmable logic, microcode, etc.), software (e.g., instructions run on a processing device), or a combination thereof. In one embodiment, the motion detection system executes the method 600 to identify motion in a video feed captured by an image capture device.

In block 610, the motion detection system collects a plurality of images corresponding to a video feed captured by an image capture device. In one embodiment, each of the images is associated with a time within a time period of the video feed (e.g., image 1 corresponds to time 1, image 2 corresponds to time 2, and image X corresponds to time X). Advantageously, the multiple images do not need to be collected or stored in an image buffer in a sequential manner, thus enabling the method 600 to be performed using a variety of different image capture devices. In one embodiment, a digital representation of each of the images of the video feed may be collected and stored.

In block 620, the motion detection system determines a plurality of cells corresponding to each of the plurality of images. In one embodiment, each image is segmented into multiple cells in accordance with a grid cell arrangement. In one embodiment, the grid cell arrangement may be determined based on the size of the incoming images or may be determined based on the type of image capture device being used. As described above, each image of the video feed is segmented into a same quantity of cells in accordance with the grid cell arrangement, as shown in the example of FIG. 2.

In block 630, the motion detection system generates a plurality of cell groups, wherein each cell group includes a cell (e.g., cell 1) of each image collected during the time period. As shown in FIG. 3, a first cell group (Cell Group 1) may be identified that includes Cell 1 of Image 1 corresponding to Time 1), Cell 1 of Image 2 corresponding to Time 2, and Cell 1 of Image X corresponding to Time X. In one embodiment, multiple cell groups are formulated, with each cell group corresponding to a respective cell of different images associated with the video feed.

In block 640, the motion detection system calculates a difference metric based on a comparison of each of the plurality of cells within a cell group. In one embodiment, the difference metric is a measurement of a difference in a parameter value associated with contents of a cell for each pairing of cells in the cell group. In one example, the difference metric may be the sum of absolute values of pixel intensity differences between a first cell of a first image (corresponding to Time 1) the first cell of a second image (corresponding to Time 2). FIG. 4 illustrates an example of a tabular structure including the calculated difference metrics for multiple cell groups (e.g., Cell Group 1 and Cell Group 2). As shown in FIG. 4, the difference metrics may be calculated for each combination of pairs of cells in a respective cell group (e.g., cell 1 at time 1 is compared to cell 1 at time 2, cell 1 at time 1 is compared to cell 1 at time 3, and cell 1 at time 1 is compared to cell 1 at time X, and so on).

In block 650, based on the difference metric information, the motion detection system determines a level of change of the difference metrics for each cell over time. In one embodiment, for each difference metric (D) associated with each cell group (e.g., the difference metrics for cell 1 for the images collected for the period of time), a first level of change (e.g., a standard deviation) is computed. For example, FIG. 5 illustrates a first level of change of the difference metrics for the various columns associated with cell group 1 over a time period of T1 to T3. In one example, for each cell group (G) a probability that a respective cell group (G) contains motion is determined. In one embodiment, the probability (also referred to as "motion probability") is calculated and compared to a threshold value to generate a classification of the cell group (G) as either "stationary" or "non-stationary". In one embodiment, characteristics of the image capture device used to capture the video feed is accounted for by the sensor noise modelling data, such that a comparison of the sensor noise modelling data and the cell comparison data generated for the video feed enables the identification of one or more regions that are non-stationary (i.e., include true motion that is not due to sensor noise).

In block 660, the motion detection system generates comparison data associated with the video feed. In one embodiment, the comparison data includes calculations of a second level of change including a measurement of a change of one or more values associated with the first level of change. In one embodiment, a standard deviation is calculated for the set of first level of change values. For example, continuing the example shown in FIG. 5, a second level of change (i.e., a standard deviation) (not shown in FIG. 5) may be calculated to determine a change with respect to the set of first level of change values (e.g., a standard deviation of $\sigma(G,1), \sigma(G,2)$, and $\sigma(G,3)$).

In block 670, the motion detection system compares the comparison data of the video feed (e.g., the second level of change values) to the sensor noise model to identify a first set of one or more regions of the plurality of images including detected motion. As described above, in one embodiment, the motion detection system determines a probability distribution that fits well to the histogram of S-values produced from the still-scene video (e.g., the model data). The motion detection system then assigns a probability of motion (P) to each cell. In one embodiment, the same probability distribution is fit to the histogram of S-values associated with the video feed including a combination of still cells and motion cells. In one embodiment, there may be a greater number of still cells as compared to cells in motion, and as such, the above-identified fitting provides a description of the S-values produced by the still-cells in the hybrid still/moving video, and may be relatively unaffected by the outlier values associated with the smaller number of in-motion cells. In one embodiment, the resulting fitted probability distribution describes the expected random distribution of S-values associated with the still-cells in the scene. In one embodiment, the results of the fitting are used as the parameters of the probability distribution (e.g., a mean and standard deviation ($\sigma F$) and mean ($\mu F$) are computed in the case where a normal distribution is used). The fitted probability distribution may be used to compute a probability that a given cell's S-value could have occurred by chance (e.g., a p-Value) given the fitted probability distribution. For example, the fitted probability distribution describes the S-values associated with the larger population of still-cells in the scene, and as such, this probability distribution may be used to compute the probability that a given cell's S-value belongs to the still-cell population (i.e., the probability that a still-cell could have a particular associated S-value).

In block 680, the motion detection system generates a transformed video feed including an indication of the one or more regions including the detected motion. In one embodiment, the transformed video feed may include the original (or raw) video feed with a visual and/or audio indication of the one or more non-stationary regions of the video feed. In one embodiment, the transformed video feed may include a heat map-type visual indication of the non-stationary region(s), wherein the non-stationary regions are visually distinct from the stationary regions.

In block 690, the motion detection system outputs the transformed video feed. In one embodiment, the transformed video feed is output to a display device (e.g., a display device associated with the motion detection system, the image capture device, or both). In one embodiment, the transformed video feed and associated information identifying the one or more non-stationary regions may be provided to an application or other system for further processing (e.g., a security application/system, a medical monitoring application/system (e.g., a respiratory activity monitoring application, etc.) In one embodiment, the transformed video feed and related information may be provided as an input to a sensor noise modelling module to provide for further development of one or more performance models associated with an image capture device.

According to embodiments of the present disclosure, the first level of change information may be used to compare to a set of activity patterns to determine if the grid of pixels corresponds to a particular activity. For example, a pattern may be established that represent human breathing activity. In an embodiment, the human breathing activity pattern may be analyzed (e.g., in accordance with a peak detection technique) to estimate respiratory rate. In an embodiment, the first level of change information may then be pattern-matched and characterized into a given type of pattern (e.g., the human breathing activity pattern). Example patterns that can be identified and matched may include, but are not limited to, breathing, earthquake vibrations, seizures, etc.

Figure 7:
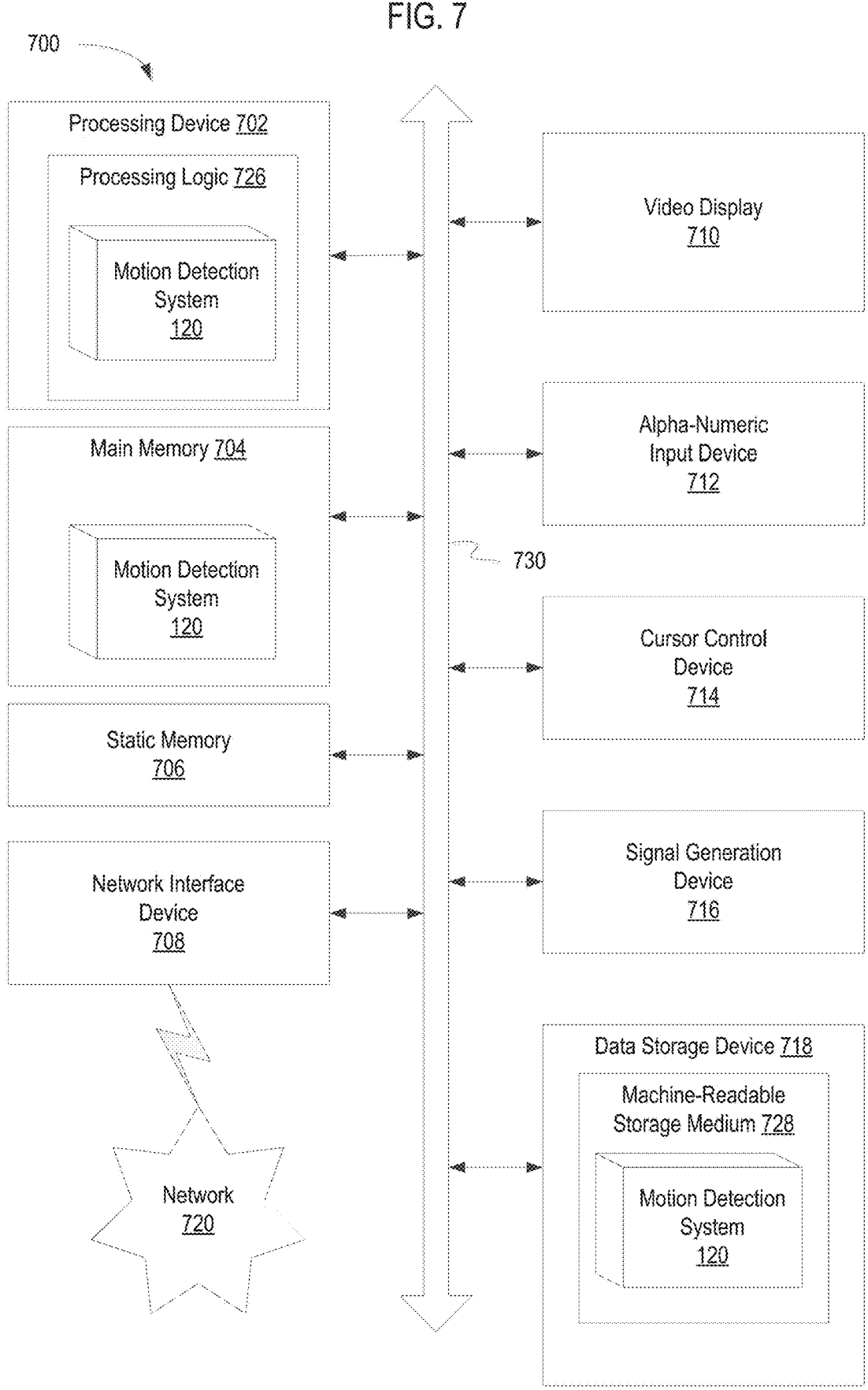
FIG. 7 is a schematic block diagram that provides an example illustration of a computing environment executing instructions relating to a motion detection system, according to one embodiment.

FIG. 7 illustrates a diagrammatic representation of a machine in the example form of a computer system 700 including a set of instructions executable by a motion detection system 120 to cause the system to perform any one or more of the methodologies discussed herein. In one embodiment, the motion detection system may include instructions to enable execution of the processes and corresponding components shown and described in connection with FIGS. 1-6.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. In various implementations of the present disclosure, the processing device 702 is configured to execute instructions for the motion detection system 120 for performing the operations and processes described herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions of the motion detection system 120 embodying any one or more of the methodologies or functions described herein. The instructions may also reside, completely or at least partially, within the main memory 704 and/or within processing logic 726 of the processing device 702 during execution thereof by the computer system 700, the main memory 704 and the processing device 702 also constituting computer-readable media.

The instructions may further be transmitted or received over a network 720 via the network interface device 708. While the computer-readable storage medium 728 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "collecting", "determining", "calculating", "generating", "causing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
collecting, by a processing device, a plurality of images of a video feed generated by a first image capture device over a first time period;
determining a plurality of cell groups based on the plurality of images, wherein a first cell group of the plurality of cell groups comprises information relating to contents of a set of first cells of the plurality of images, wherein each of the first cells corresponds to a different time in the first time period;
calculating a first difference metric corresponding to one or more comparisons of the information relating to contents of the set of first cells of the first cell group;
determining one or more levels of change corresponding to values of the first difference metric relating to the set of first cells;
determining, based on a comparison of the one or more levels of change and a still-scene data model corresponding to the first image capture device, a probability that the first cell group comprises motion;
determining the first probability is greater than or equal to a threshold value;
generating a transformed video feed comprising a video feed and a visual indication of the motion; and
causing an output of the transformed video feed.

2. The method of claim 1, further comprising generating the still-scene data model based at least in part on one or more sensor parameters corresponding to the first image capture device and a model video feed corresponding to a still-scene environment.

3. The method of claim 1, wherein the first difference metric is based on a comparison of a first parameter for each pair of first cells in the first cell group.

4. The method of claim 3, wherein a first value of the first difference metric is a sum of absolute values of pixel intensity differences between a first pair of first cells of the first cell group.

5. The method of claim 1, wherein each of the set of first cells comprises a common portion of the plurality images captured at a plurality of different times over the first time period.

6. The method of claim 1, further comprising:
comparing information associated with at least one of the one or more levels of change to a predetermined pattern associated with a first activity;
identifying a match between the information associated with the at least one of the one or more levels of change to the predetermined pattern associated with the first activity; and
categorizing the video feed as comprising the first activity, wherein the first activity comprises respiratory activity.

7. The method of claim 1, wherein first difference metric is calculated based on a comparison of a plurality of pairs comprising each combination of the first cells of the set of first cells.

8. A system comprising:
a processing device; and
memory to store computer-executable instructions that, if executed, cause the processing device to:
collect a plurality of images of a video feed generated by a first image capture device over a first time period;
determine a plurality of cell groups based on the plurality of images, wherein a first cell group of the plurality of cell groups comprises information relating to contents of a set of first cells of the plurality of images;
calculate a first difference metric based on the information relating to contents of the set of first cells of the first cell group;
determine one or more levels of change of values of the first difference metric relating to the set of first cells;
determine, based on a comparison of the one or more levels of change and a still-scene data model corresponding to the first image capture device, a probability that the first cell group comprises motion;
determine the first probability is greater than or equal to a threshold value;
generate a transformed video feed comprising a video feed and a visual indication of the motion; and
cause an output of the transformed video feed, wherein the output comprises an alert indicating the motion.

9. The system of claim 8, the processing device to:
generate the still-scene data model based at least in part on one or more parameters corresponding to the first image capture device and a model video feed corresponding to a still-scene environment.

10. The system of claim 8, the processing device to compare a first parameter of a pair of first cells of the first cell group to calculate the first difference metric.

11. The system of claim 8, the processing device to generate a plurality of still-scene data models each corresponding to a different image capture device.

12. The system of claim 8, wherein the first parameter is a pixel intensity value of pixels of each of the first cells of the pair of first cells.

13. The system of claim 8, wherein the still-scene data model comprises a representation of sensor noise associated with the image capture device.

14. A non-transitory computer-readable storage device storing computer-executable instructions that, if executed by a processing device, cause the processing device to:
store a plurality of images of a video feed generated by a first image capture device corresponding to a first time period;
segment a first image of the plurality of images into a grid comprising a plurality of cells, wherein each cell represents a portion of contents of the first image;
determine a plurality of cell groups based on the plurality of images, wherein a first cell group of the plurality of cell groups comprises information relating to a first portion of the contents of a set of first cells of the plurality of images;
calculate a first difference metric based on the information relating to the contents of the set of first cells of the first cell group;
determine at least one level of change of values of the first difference metric relating to the set of first cells;
determine, based on a comparison of the at least one level of change and a still-scene data model corresponding to the first image capture device, a probability that the first cell group comprises motion;

determine the first probability is greater than or equal to a threshold value;

generate a transformed video feed comprising a video feed and a visual indication of the motion; and cause an output of the transformed video feed, wherein the transformed video feed comprises a heat-map indication corresponding to the motion.

15. The non-transitory computer-readable storage device of claim 14, the processing device to generate the still-scene data model based at least in part on one or more parameters corresponding to the first image capture device and a model video feed corresponding to a still-scene environment.

16. The non-transitory computer-readable storage device of claim 14, the processing device to compare a first parameter of a pair of first cells of the first cell group to calculate the first difference metric.

17. The non-transitory computer-readable storage device of claim 14, the processing device to generate a plurality of still-scene data models each corresponding to a different image capture device.

18. The non-transitory computer-readable storage device of claim 14, wherein the still-scene data model comprises a representation of sensor noise associated with the image capture device.

19. The non-transitory computer-readable storage device of claim 14, the processing device to:

compare information associated with at least one of the one or more levels of change to a predetermined pattern associated with a first activity;

identify a match between the information associated with the at least one of the one or more levels of change to the predetermined pattern associated with the first activity; and categorize the video feed as comprising the first activity, wherein the first activity comprises respiratory activity.

20. The non-transitory computer-readable storage device of claim 14, wherein the first difference metric is calculated based on a comparison of a plurality of pairs comprising each combination of first cells of the set of first cells.

* * * * *